United States Patent [19]
Scholl et al.

[11] Patent Number: 5,273,704
[45] Date of Patent: Dec. 28, 1993

[54] PROCESS FOR EXTRUDING A POLYMER ONTO A GLAZING

[75] Inventors: Heinz Scholl, Eschweiler; Hans-Georg Friedrich, Wurselen; Friedhelm Hammes, Herzogenrath, all of Fed. Rep. of Germany

[73] Assignee: Saint-Gobain Vitrage International, Courbevoie, France

[21] Appl. No.: 771,084

[22] Filed: Oct. 2, 1991

[30] Foreign Application Priority Data

Oct. 4, 1990 [DE] Fed. Rep. of Germany ....... 4031236

[51] Int. Cl.$^5$ ............................................. B29C 47/24
[52] U.S. Cl. .................................... 264/252; 264/167; 264/177.1; 264/177.16; 264/254; 264/259; 425/183; 425/190; 425/464; 425/465; 425/466
[58] Field of Search ............... 264/167, 177.1, 177.16, 264/252, 511, 254, 259; 425/114, 183, 190, 464, 465, 466; 52/208

[56] References Cited

U.S. PATENT DOCUMENTS

| | | | |
|---|---|---|---|
| 2,402,281 | 6/1946 | Green | 425/465 |
| 2,982,995 | 5/1961 | Groleau | 425/466 |
| 3,957,406 | 5/1976 | Battersby | 425/87 |
| 4,083,666 | 4/1978 | Richardson | 425/183 |
| 4,120,999 | 10/1978 | Chenel et al. | 428/34 |
| 4,145,173 | 3/1979 | Pelzer et al. | 425/224 |
| 4,256,685 | 3/1981 | Vassar | 264/167 |
| 4,531,326 | 7/1985 | Ballocca et al. | 497/49 |
| 4,569,815 | 2/1986 | Rentz et al. | 425/183 |
| 4,576,773 | 3/1986 | Azzola et al. | 264/167 |
| 4,581,276 | 4/1986 | Kunert et al. | 428/157 |
| 4,584,150 | 4/1986 | Ballocca | 264/167 |
| 4,704,175 | 11/1987 | Kunert et al. | 156/108 |
| 4,910,071 | 3/1990 | Kunert | 128/192 |
| 4,933,032 | 6/1990 | Kunert | 156/108 |
| 4,938,521 | 7/1990 | Kunert | 296/96.21 |
| 4,960,375 | 10/1990 | Saito | 264/167 |
| 4,983,113 | 1/1991 | Hirschkorn | 425/183 |
| 4,986,867 | 1/1991 | Braendle et al. | 156/244.11 |
| 5,057,265 | 10/1991 | Kunert et al. | 264/511 |
| 5,085,021 | 2/1992 | Kunert | 52/397 |
| 5,108,526 | 4/1992 | Cornils et al. | 264/177.1 |
| 5,110,529 | 5/1992 | Arima | 264/167 |

*Primary Examiner*—Jan H. Silbaugh
*Assistant Examiner*—Brian J. Eastley
*Attorney, Agent, or Firm*—Pennie & Edmonds

[57] ABSTRACT

A method of shaping an extruded section of polymer directly onto the surface edges of a glazing or glass plate. In one embodiment, a rotatable plate member having a plurality of calibrated die cross sections is placed in front of the exit orifice of an extrusion die. The plate member is rotated to obtain, an extruded section having different profile cross sections and the flow rate of the polymer through the die is controlled in response to the position of the plate member so that the amount of polymer being fed corresponds to the respective profile section being extruded. In another embodiment, an obturating slide member is placed in front of an extrusion die exit orifice sized to correspond to the largest desired profile cross section. To produce abrupt changes in profile cross section, the slide is moved quickly at predetermined locations along the path of the extrusion die. To produce a continuous transition between profile sections, the slide is moved slowly during extrusion. The flow rate of the polymer material to be extruded is regulated in response to the position of the obturating slide member.

15 Claims, 4 Drawing Sheets

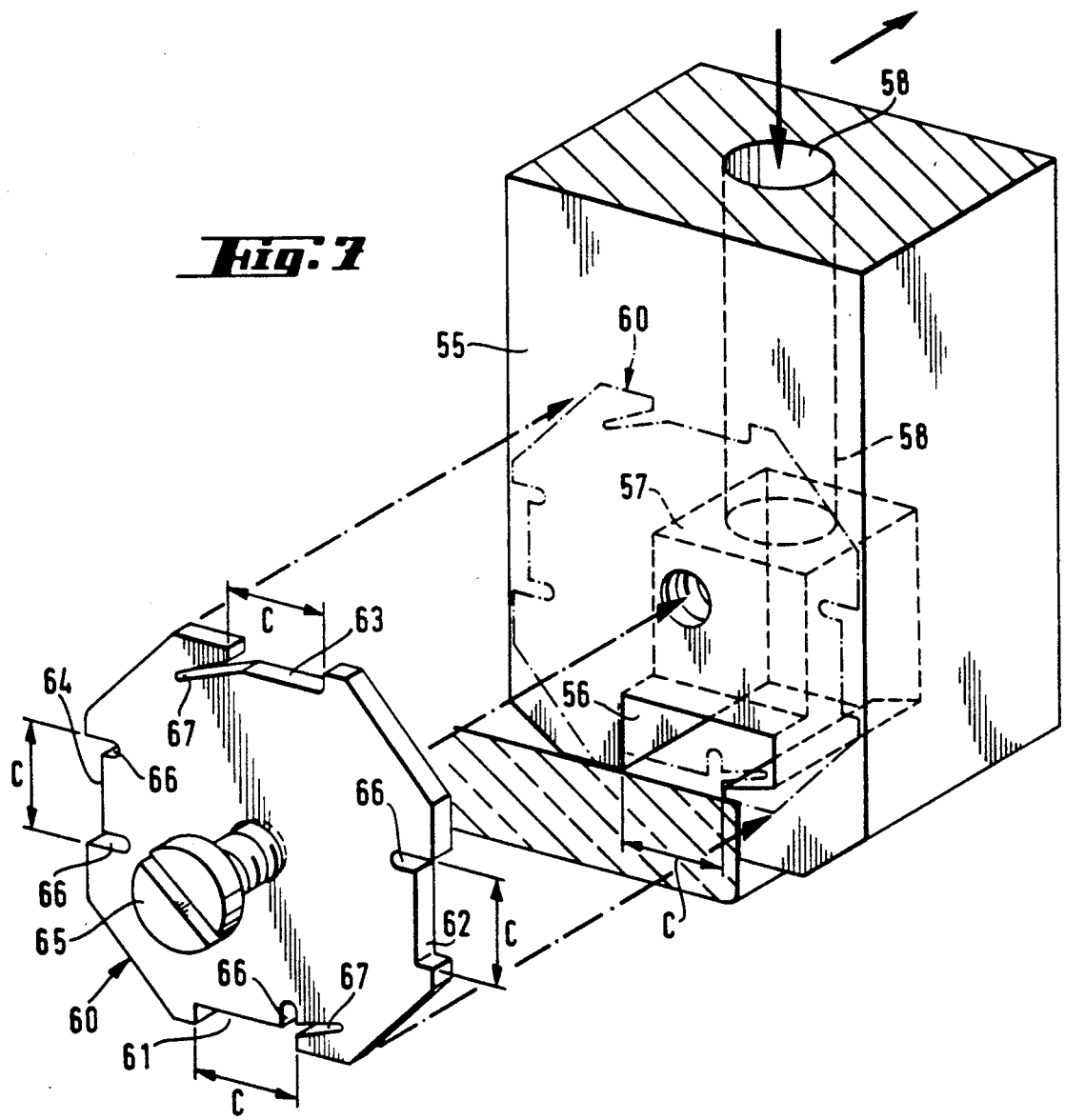

PROCESS FOR EXTRUDING A POLYMER ONTO A GLAZING

FIELD OF THE INVENTION

The invention relates to an apparatus and process for shaping an extruded section of polymer directly onto the surface of a glazing or glass plate. Particularly, the polymer is extruded onto the edge surface of the glazing along its circumference with an extrusion die. The extrusion die includes a calibrated exit orifice and a distributing chamber that is positioned upstream of the orifice.

BACKGROUND OF THE INVENTION

In the prior art, it is known to provide car glazings or glass plates with a frame-like profile of a polymer. Specifically, an extrudable polymer adhering to the corresponding prepared glazing surface is extruded directly thereon with the aid of an extrusion die. See, for example, U.S. Pat. Nos. 4,581,276, 4,704,175, 4,571,278, 4,551,372, 4,876,132, 4,938,521, 4,933,032 and German patent nos. 36 27 536 and 38 18 930. Typically, a robot places the extrusion die on an edge of the glazing and moves it along the edge of the glazing. Simultaneously with the movement of the extrusion die, a suitable processor controls a dosing device for the polymer to be extruded The extruded section is then cured and can be used for various purposes.

Typically, the extruded section includes an intermediate body connected to the glazing and to which an assembly adhesive bead has been applied for the assembly of the glazing by an adhesion process. For this purpose, the extruded section advantageously has a channel-like profile cross-section. This channel-like profile, for example, serves as a boundary web for the adhesive bead, preventing any passage of the adhesive material into the field of vision of the glazing when the latter is assembled into the window frame of a car body.

The extruded section can be of the type which is supported against parts of the window frame when the glazing is inserted therein. Consequently, the extruded section further serves to position and fix the glazing when the adhesive bead is cured. Finally, such an extruded section can be in the form of a lip or have a lip which projects outward over the glazing's circumference, closing the gap that remains between the circumferential surface of the glazing and the flange of the window frame that faces the glazing.

A section extruded onto the edge of a glazing can simultaneously fulfill different functions. One embodiment of such an extruded section has a flat-profiled portion with a relatively wide base surface and a lip-like portion projecting outwardly over the glazing's circumference. In this case, the flat-profiled portion serves as an intermediate body for the assembly adhesive bead. The outwardly projecting lip serves as a centering lip when the glazing is inserted in the window frame and as a tightening and decorative lip when the glazing is installed. Glazings pre-equipped with such an extruded section are being used with increasing frequency. (Karl-Heinz Bruck: "Fahrzeugverglasung", Verlag Vieweg, 1990).

In most cases, the process described above provides glazings with an all-round frame that has the same profile cross-section over the entire circumference of the glazing. However, in some cases, it is necessary to provide glazings with an extruded frame, which in specific portions have different profile cross-sections.

One solution has been to provide car glazings with a lip-free, U-profile cross section along its lower horizontal edge, while providing the upper horizontal edge and the two vertical edges with an extruded section which has a lip projecting over the circumference of the glazing. Hitherto, such a frame has been produced in a two process step. In the first step, a first portion of the frame is produced using a first extrusion die and, in the second step, a second portion of the frame is produced with a second extrusion die.

The object of the invention is to provide an apparatus and process for extruding sections of polymer having different profile cross sections with only a single extrusion die.

SUMMARY OF THE INVENTION

According to the invention, this object is achieved by placing a plate member or obturating slide in front of the exit orifice of an extrusion die so as to adjust the die cross-section of the exit orifice. With the plate member or obturating slide brought into different positions that correspond to different die cross-sections, extruded sections with different profile cross-sections can be realized.

A first embodiment of the inventive apparatus is provided for producing extruded sections with different profile cross-sections along the circumference of a glazing. This embodiment is characterized in that the extrusion die orifice is calibrated or sized in accordance with the largest desired profile cross-section. Partially covering the exit orifice with the obturating slide changes the die cross-section of the exit orifice, thereby producing a different profile cross-section. The slide, which is movably positioned in front of the calibrated exit orifice, can be brought into different predetermined end positions with the aid of a suitable hydraulic or pneumatic jack. In this manner, it is possible to bring about a profile cross-section change at a specific desired location along the path of the extrusion die. Alternatively, the obturating slide can be controlled in a manner such that it continuously changes the die cross-section of the calibrated exit orifice while the extrusion die is in motion. This makes it possible to produce profile cross-sections that have a continuously changing transition over randomly long paths. In both cases, the volume flow of the polymer material to be extruded can be simultaneously controlled with the positioning of the obturating slide.

In another embodiment of the inventive apparatus, the die cross-section of the exit orifice is larger than the profile cross-sections to be extruded. A rotatable plate member having at least two different calibrated die cross-sections is disposed in front of the exit orifice. In each case, the desired die cross-section, corresponding to the desired profile cross-section of the extruded section, is positioned directly in front of the exit orifice.

BRIEF DESCRIPTION OF THE DRAWINGS

The invention is described in greater detail with reference to the attached drawings, wherein:

FIG. 7 is view of an extrusion die with a rotatable plate member having several calibrated die cross-sections.

DETAILED DESCRIPTION OF THE PREFERRED EMBODIMENTS

Figure 1:
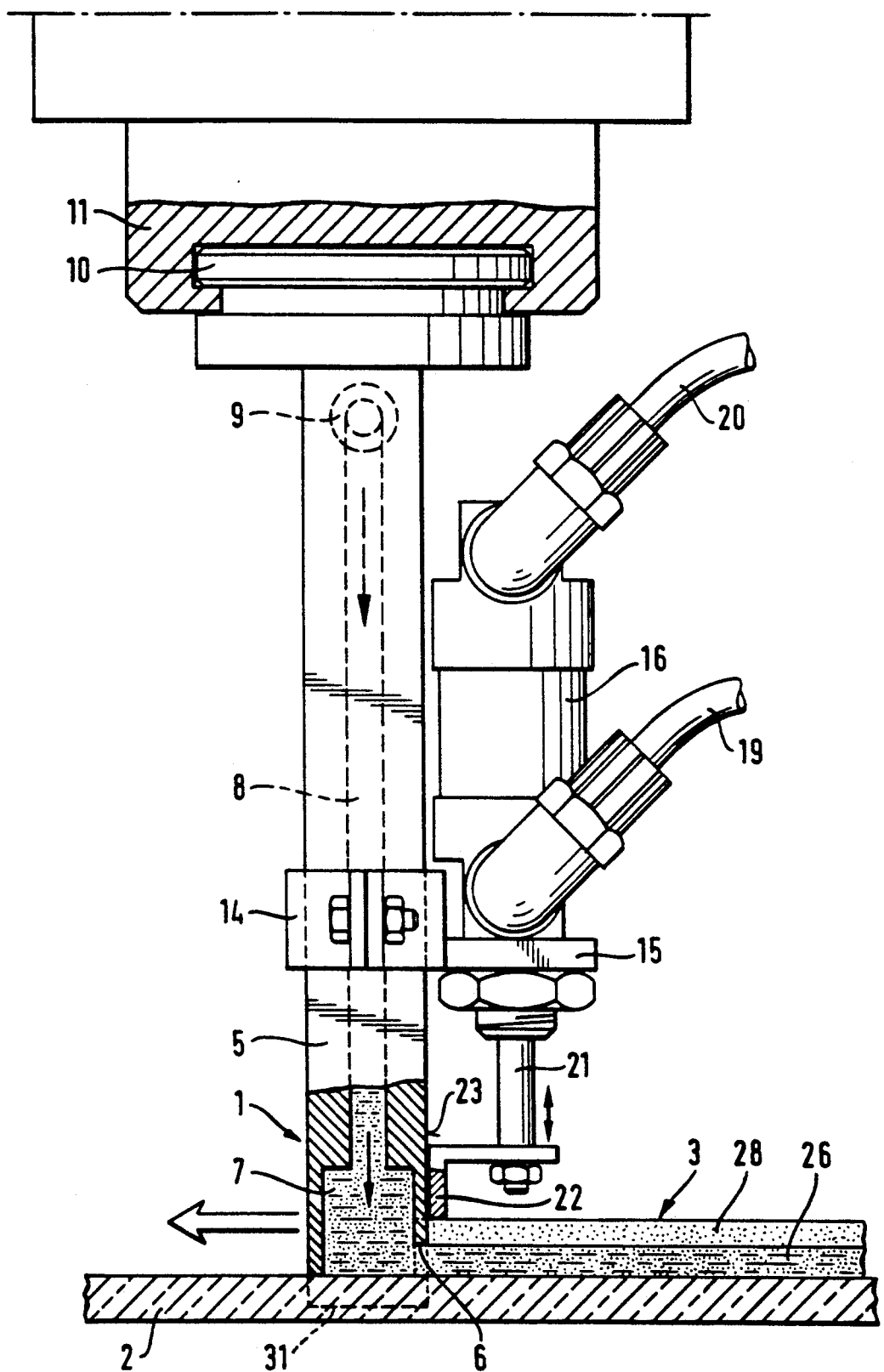
FIG. 1 is side view of an extrusion die with a controllable obturating slide in front of a calibrated exit orifice.

FIGS. 1 to 4 show the basic construction of a first embodiment of the inventive extrusion die in which the die body has a calibrated exit or discharge orifice. An extrusion die 1 provides an automobile glazing or glass plate 2 along its circumference with an extruded section 3 of an extrudable polymer, which is extruded directly onto glazing 2. The extrudable polymer, for example, is a moisture-hardening, single component polyurethane. Preferably, extrusion die 1 is moved along the edge of qlazing 2 by the arm of a robot.

As illustrated in FIG. 1, extrusion die 1 comprises a die body 5 with a calibrated exit orifice 6 laterally arranged at its lower end, a distributing chamber 7 positioned upstream of exit orifice 6, and a supply channel 8 feeding from a connecting socket 9. A tube or hose, not shown, is connected to connecting socket 9 through which the polymer material to be extruded is supplied to the extrusion die in a regulated quantity by means of a dosing device. At its upper end, die body 5 is provided with a circular shoulder 10, which is fixed in a corresponding mounting support 11 that is guided by a robot arm To die body 5 is fixed a circular mounting supporting 14, which carries a bracket 15 to which a pneumatic jack 16 is fixed parallel to the longitudinal axis of die body 5. Pneumatic jack 16 is controlled with the aid of a not shown electropneumatic, multi-path valve via the two pressure lines 19 and 20. To the end of a piston rod 21 is fixed an obturating slide 22, which engages tightly against a wall 23 of die body 5 and is optionally guided in a lateral sliding guide that is not shown here.

Figure 2:
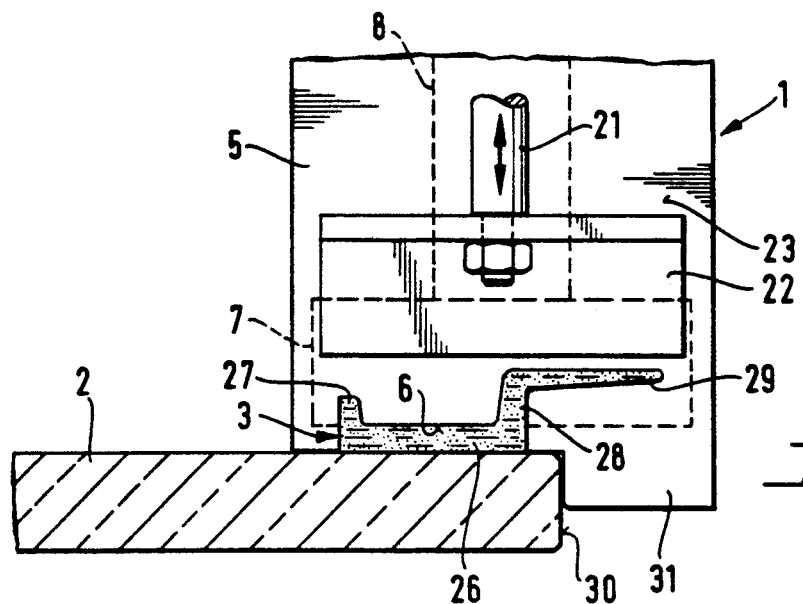
FIG. 2 is a partial view of the extrusion die shown in FIG. 1 with a completely open calibrated exit orifice.
Figure 3:
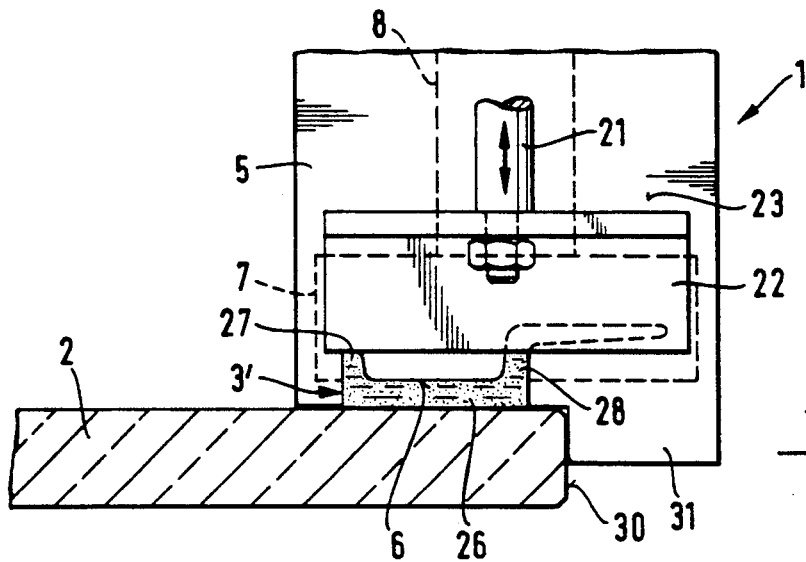
FIG. 3 is a partial view of the extrusion die shown in FIG. 1 with the obturating slide partially covering the calibrated exit orifice.
Figure 4:
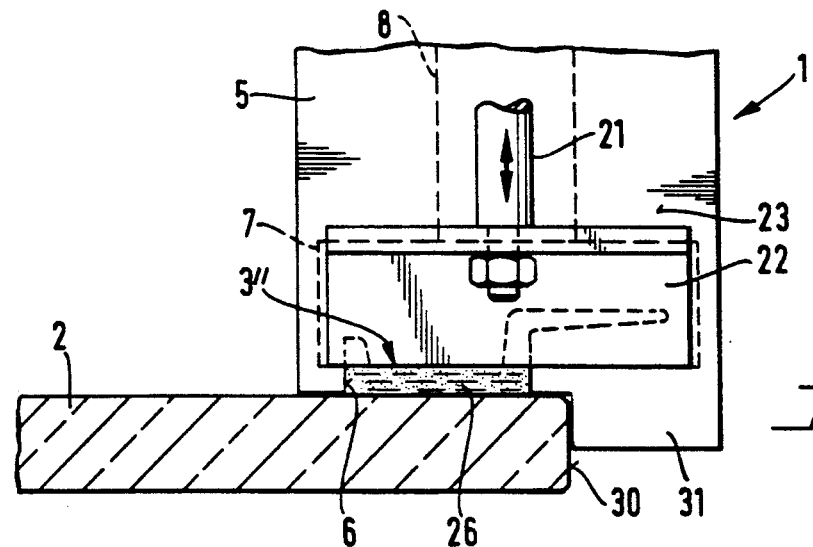
FIG. 4 is a partial view of the extrusion die shown in FIG. 1 with the obturating slide more completely covering the calibrated exit orifice.

Piston rod 21 can assume two or optionally three end positions, as shown in FIGS. 2 to 4. In its upper end position, slide 22 does not obstruct the opening of calibrated exit orifice 6. Therefore in this upper end position of slide 22, extruded section 3 is extruded, whose profile cross-section corresponds to unobstructed die cross-section of calibrated exit orifice 6. In the present case, the profile cross-section of extruded section 3 comprises a base portion 26; an inner vertical rib 27 that is approximately at right angles to base portion 26 and is located on the side of base portion 26 facing the visible surface of glazing 2; an outer vertical rib 28 that is approximately at right angles to base portion 26 on the side of the latter adjacent to the glazing edge; and a lip 29 that is located on outer vertical rib 28 and runs approximately parallel to the glazing and extends beyond a circumferential surface 30.

In the position shown in FIG. 3, slide 22 covers the upper portion or opening of calibrated exit orifice 6; that is, the part corresponding to lip 29. Thus, when slide 22 is in this position, the profile cross-section of an extruded section 3' comprises base portion 26, inner vertical rib 27 and outer vertical rib 28.

By further lowering slide 22 in the manner shown in FIG. 4, it is additionally possible to cover the portion of calibrated exit orifice 6 which corresponds to inner and outer vertical ribs 27 and 28, respectively. Thus, in this position of slide 22, an extruded section 3" is extruded, whose profile cross-section comprises only base portion 26.

During the extrusion process, die body 5 is moved along the edge of glazing 2 with a guide edge 31 that is being supported against circumferential surface 30 of glazing 2.

The described extrusion die is able to extrude continuously three different frame profiles, which have a constant cross-section along the entire circumference of the glazing. In this case, there is no change to the position of slide 22 during the extrusion cycle along the glazing's circumference. It instead retains the position which it had before the start of the extrusion process.

Figure 5:
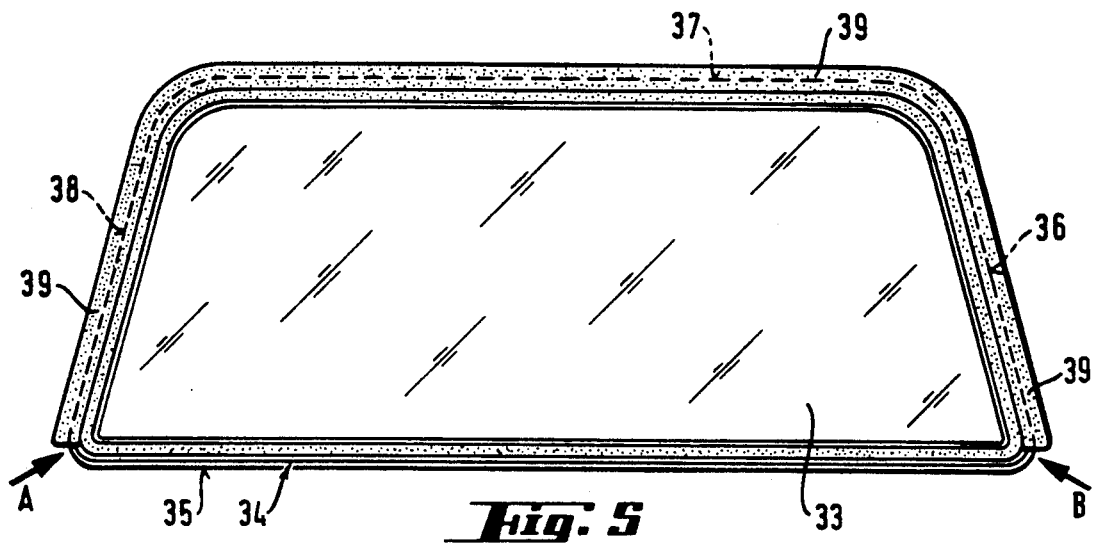
FIG. 5 is a view of a car glazing, which is provided with an extruded frame having two different profile cross-sections.

A particular advantage of the inventive extrusion die is that an extruded section can be extruded onto a glazing so as to have different profile cross-sections along successive portions. A glazing 33, which is pre-equipped with a profile frame having two different profile cross-sections, is shown in FIG. 5. In this case, glazing 33 is provided with an extruded profile frame 34. Profile frame 34 has a U-shaped profile cross-section on the path along a lower glazing edge 35, and a shape-on lip portion 39 and U-shaped profile cross-section on the path along the three remaining glazing edges 36, 37, 38. In this case, the position of slide 22 is changed accordingly during the cycle of the extrusion die along the circumference of the glazing, such as on reaching corner point B. Optionally, this may be accompanied by a brief stoppage of the die.

During the further movement of the extrusion die, it is also possible to slowly move slide 22 from one end position to another, so that over a longer distance a continuous transition from one profile cross-section to another is obtained.

Figure 6:
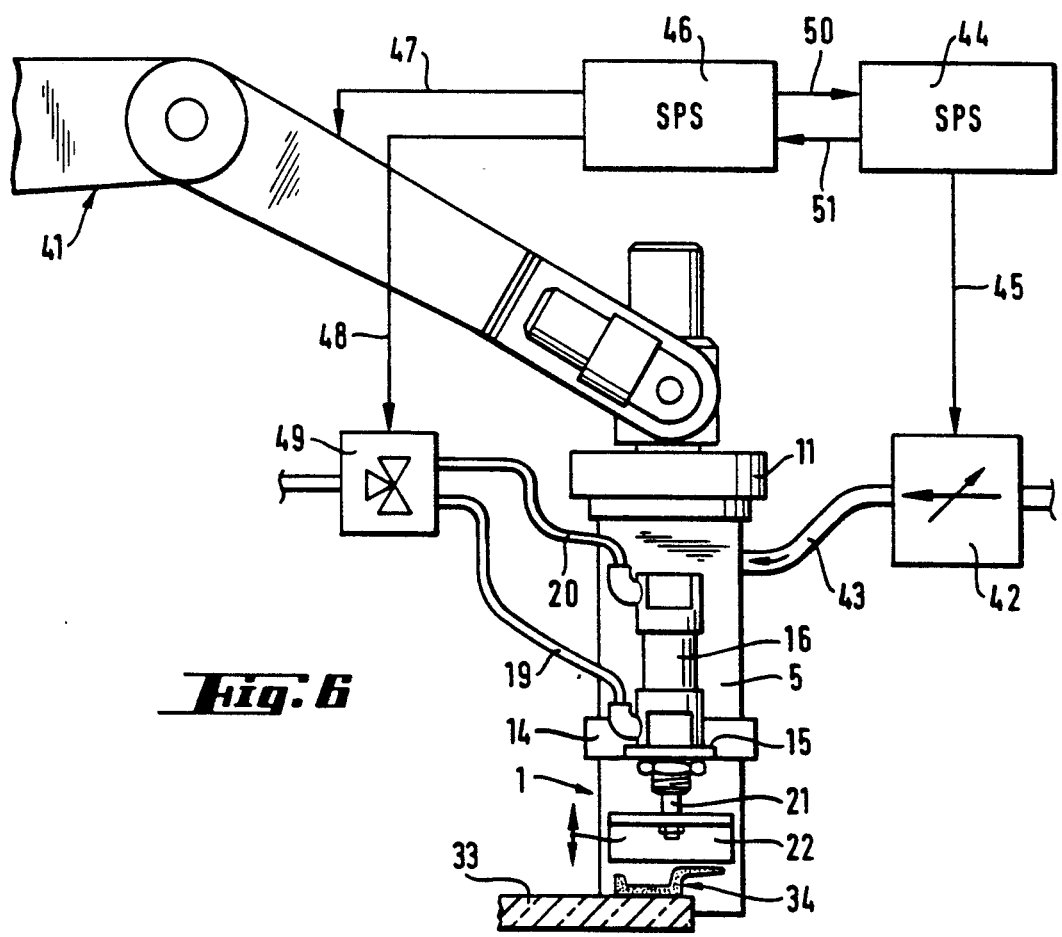
FIG. 6 is block representation of the functional sequence when using the extrusion die shown in FIG. 1.

The sequence of the extrusion process for producing the profile frame shown in FIG. 5 is represented in block diagram in FIG. 6. Die body 5 with calibrated exit orifice 6 is moved along the edge of the glazing by a robot 41. Pneumatic jack 16 located on die body 5 moves obturating slide 22 into an upper and a lower end positions. With the aid of a dosing device 42 and a tube 43, die body 5 is supplied with a regulated volume flow of the polymer to be extruded. The particular volume flow is appropriately matched to the desired profile cross-section. Dosing device 42 is controlled via line 45 by a memory-programmable control 44. Memory-programmable control 46 controls via a line 47 robot 41; via control line 48 a three-way valve 49; and via control line 50 memory-programmable control 44. Memory-programmable control 44, in turn, passes to robot memory-programmable control 46 the acknowledgement via a line 51. With the aid of three-way valve 49, slide 22 is moved via pressure lines 19 and 20 into its two end positions.

At the start of an extrusion cycle, when the glazing to be provided with an extruded section is positioned in the extrusion station, control line 48 directs slide 22 to be brought against die body 5 in its lower end position, corresponding to FIG. 3. Robot 41 then places die body 5 at point A (FIG. 5) on glazing 33 and starts its cycle along lower edge 35. During this path, dosing memory-programmable control 44 is adjusted by the program of robot memory-programmable control 46 such that the volume flow supplied by dosing device 42 corresponds to the volume flow required for extruding the extruded section on the portion A-B. As soon as die body 5 reaches point B (FIG. 5), the movement of die body 5 is briefly interrupted via control line 47. Subsequently, via control line 48, slide 22 is brought into its upper end position, corresponding to FIG. 2. Control line 50 simultaneously causes dosing memory-programmable control 44 to direct dosing device 42 to adjust the volume flow to the larger volume flow required for the continuation of the remaining extruded section. As soon as the adjustment to the larger volume flow has taken place, a corresponding readiness notification is provided via line 51 to robot memory-programmable control 46, which causes robot 41 to continue the extrusion process.

FIG. 7 shows another embodiment of the inventive extrusion die, which enables four different profile cross-sections to be produced. The die body 55 has a calibrated exit orifice 56, a distributing chamber 57 positioned upstream of exit orifice 56, and a supply channel 58. However, exit orifice 56 is not profiled corresponding to a specific profile cross-section. Exit orifice 56 instead has a cross-sectional surface which, with the exception of the opening width C at the bottom of the die body, is larger than the different profile cross-sections to be extruded. Exit orifice 56 is covered by a rotatable plate member 60 on whose circumference are formed four different calibrated die cross-sections 61, 62, 63, 64. Plate member 60 is fixed by a screw 65 to die body 55. By turning plate member 60 in each case by 90°, one of the adjacent calibrated die cross-sections can be brought in front of exit orifice 56. For all four die cross-sections 61 to 64, the base always has the same width C, which corresponds to the width of exit orifice 56 at the bottom of die body 55. The four different die cross-sections differ: die cross-section 61, apart from the base part, has a calibrated slot 66 for an inner vertical rib and a calibrated slot 67 for a centering lip; die cross-section 62, apart from the base part, only has a calibrated slot 66 for an inner vertical rib; die cross-section 63 only has a calibrated slot 67 for a centering lip; and die cross-section 64 has two calibrated slots 66 for the two corresponding inner vertical ribs.

Obviously, the extrusion die shown in FIG. 7 can be provided with an automatic adjustment mechanism for plate member 60, such as a suitable electric motor, through which the plate member can in each case be rotated by 90°. Such an extrusion die makes it possible to change the extrusion profile cross-section, for example, during a cycle of the die along the edge of the glazing. The process sequence is similar to the process described with respect to FIG. 6. In this case, during the change from one profile cross-section to another, the extrusion die is briefly stopped and raised somewhat from the glazing. Immediately following the rotary movement of plate member 60, the extrusion die is again placed on the glazing and continues its travel along the edge of the glazing.

What is claimed is:

1. A process for forming an extruded polymer onto a glazing comprising:
    placing an extrusion die means against an edge of a glazing, wherein said die means includes a calibrated exit orifice and a rotatable plate rotatably positionable in front of said exit orifice, said rotatable plate having formed around its circumference at least two different die cross-sections rotatably positionable in front of said exit orifice to define corresponding profile cross-sections of polymer extruded through said exit orifice.
    rotatably positioning said plate in a first location to position a first of said die cross sections in front of said exit orifice;
    guiding said die means along and against a first portion of an edge of the glazing;
    delivering a flowable polymer at a first flow rate to said die means, to form a first extruded section of said polymer having a first profile cross section corresponding to said first die cross section along said first portion;
    guiding said die means along and against a second portion of the edge of said glazing;
    rotatably positioning said plate into a second location to position a second die cross section in front of said exit orifice; and
    delivering said polymer at a second flow rate to said die means to form a second extruded section of said polymer along said second portion having a second profile cross section corresponding to said second die cross section.

2. The process of claim 1 wherein said first portion is a circumferential edge portion of said glazing and wherein said first section is formed as a continuous extruded section therealong.

3. The process of claim 1 wherein each of said delivery steps includes utilizing dosing means for delivering a regulated quantity of said polymer corresponding to the die cross section of said rotatable plate positioned in front of said exit orifice to said die means.

4. The process of claim 1 wherein said utilising step includes controlling said dosing means by a memory-programmable control device.

5. The process of claim 1 wherein said step of guiding said die means along and against said first and second portions includes utilizing a robot to move said die means.

6. The process of claim 5 wherein said robot utilizing step includes controlling said robot by a memory programmable control device.

7. A process for extruding a polymer onto a glazing comprising:
    placing an extrusion die means against an edge of said glazing, wherein said die means includes a calibrated exit orifice and a rotatable plate having formed around its circumference at least two different die cross-sections rotatably positionable in front of said exit orifice to define corresponding profile cross-sections of polymer extruded through aid exit orifice;
    delivering a flowable polymer to said die means while guiding said die means along a first portion of a path defined by the circumferential edge of said glazing to
    form on said first portion of said glazing edge a first extruded section of said polymer having a first profile cross section;
    rotatable positioning said rotatable plate to position a second die cross section in front of said exit orifice,
    guiding said die means along a second portion of said path to form a second extruded section of said polymer having a second profile cross section; wherein the flow rate of aid polymer to said die means is varied at least once along said path.

8. The process according to claim 7, wherein each rotatably positioning step is performed while said die means is stationary.

9. The process according to claim 7, wherein each rotatably positioning step is performed at a predetermined point along said path.

10. The process according to claim 7, wherein said flow rate of said polymer is modified according to the position of said die means along said path.

11. The process according to claim 10, wherein said flow rate is modified by a programmable controller.

12. The process according to claim 7, further comprising the step of rotatably positioning said rotatable plate to position a third die cross section in front of said exit orifice, thereby forming along a third portion of said path a third extruded section of said polymer having a third profile cross section.

13. The process according to claim 7, wherein said guiding step includes using a robot to move said die means along said path.

14. A process for extruding a polymer onto a glazing comprising:

placing an extrusion die means against an edge of said glazing, wherein said die means includes a calibrated exit orifice and a rotatable plate said rotatable plate having formed around its circumference at least two different die cross-sections rotatably positionable in front of said exit orifice to define corresponding profile cross-sections of polymer extruded through said exit orifice;

rotatably positioning said rotatable plate to position a first of said die cross-sections in front of said exit orifice;

guiding said die means along and against said glazing edge;

delivering said polymer to said die means at a first flow rate so as to form a first extruded section of said polymer; and modifying the first flow rate and the size of the exit orifice by rotatably positioning said rotatable plate, to position a second die cross section in front of said exit orifice according to the position of the extrusion die so as to form a second extruded section of said polymer.

15. The process of claim 14 which further comprises utilizing a memory-programmable control device for controlling the flow of the polymer and the movement of the die means.

* * * * *